(12) United States Patent
Yokoyama

(10) Patent No.: US 8,731,555 B2
(45) Date of Patent: May 20, 2014

(54) COMMUNICATION METHOD, USER EQUIPMENT AND RADIO BASE STATION IN RADIO COMMUNICATION SYSTEM

(75) Inventor: Hitoshi Yokoyama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 12/207,687

(22) Filed: Sep. 10, 2008

(65) Prior Publication Data

US 2009/0170514 A1 Jul. 2, 2009

(30) Foreign Application Priority Data

Dec. 26, 2007 (JP) ................................. 2007-333849

(51) Int. Cl.
*H04W 16/28* (2009.01)

(52) U.S. Cl.
USPC .................. 455/436; 455/456.1; 455/450

(58) Field of Classification Search
CPC ...... H04W 36/18; H04W 76/02; H04W 64/00
USPC ................................ 455/63.4, 562.1, 69, 561
See application file for complete search history.

(56) References Cited

U.S. PATENT DOCUMENTS

| | | | |
|---|---|---|---|
| 7,130,663 | B2 | 10/2006 | Guo |
| 7,627,298 | B2 | 12/2009 | Taira et al. |
| 8,335,529 | B2 | 12/2012 | Taira et al. |
| 2004/0014429 | A1 | 1/2004 | Guo |
| 2005/0037799 | A1 | 2/2005 | Braun et al. |
| 2005/0153657 | A1* | 7/2005 | Maruta ........................ 455/63.4 |
| 2007/0243878 | A1 | 10/2007 | Taira et al. |
| 2011/0151912 | A1 | 6/2011 | Taira et al. |

FOREIGN PATENT DOCUMENTS

| | | |
|---|---|---|
| CN | 1656711 | 8/2005 |
| JP | 2001-203630 | 7/2001 |
| JP | 2004-072539 | 3/2004 |
| JP | 2004-507151 | 3/2004 |
| JP | 2005-65257 | 3/2005 |
| JP | 2007-13285 | 1/2007 |
| JP | 2007-235415 | 9/2007 |
| JP | 2007-259077 | 10/2007 |
| JP | 2008-538066 A | 10/2008 |
| WO | 2006/113188 A2 | 10/2006 |

OTHER PUBLICATIONS

3 GPP TS 36.300 V8.2.0 Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description Stage (Release 8); Sep. 2007.
3GPP TSG RAN WG1 Metting #48bis(R1-071630) St. Julians, Malta, NTT DoCoMo, Fujitsu Limited, Institute for Infocomm Research, Mitsubishi Electric, NEC, Panasonic, Sharp, Toshiba Corporation, "Transmit Diversity Scheme for SCH in E-UTRA"; Mar. 26-30, 2007.

(Continued)

*Primary Examiner* — Phuoc H Doan
(74) *Attorney, Agent, or Firm* — Myers Wolin, LLC

(57) ABSTRACT

A user equipment transmits information for a radio base station using either of radio resources associated with individual multi-beams, which may be formed by the radio base station, and the radio base station performs reception processing of the radio resources for the individual multi-beams.

19 Claims, 21 Drawing Sheets

(56) References Cited

OTHER PUBLICATIONS

The State Intellectual Property Office of China, First Notification of Office Action for corresponding Chinese Patent Application No. 200810149800.4, issued Feb. 12, 2010. English translation attached.
Korean Intellectual Property Office, "Notice of Preliminary Rejection" for corresponding Korean Patent Application No. 10-2008-97404, mailed May 27, 2010. English translation attached.
Office Action issued for corresponding Japanese Patent Application No. 2007-333849 mailed on on Aug. 7, 2012 with English translation.
Interrogation issued for corresponding Japanese Patent Application No. 2007-333849, dispatched on Aug. 20, 2013, with English translation.
Extended European Search Report issued for corresponding European Patent Application No. 08164076.5, mailed Jul. 6, 2011.
NTT DoCoMo et al.: "Closed Loop-Based Antenna Switching Transmit Diversity in E-UTRA Uplink"; Agenda Item: 6.6.3; R1-063314; 3GPP TSG RAN WG1 Meeting #47; Riga, Latvia, Nov. 6-10, 2006 (Original R1-062287); [Ref.: EESSR mailed Jul. 6, 2011].
NTT DoCoMo; "UL Transmit Diversity Schemes in LTE-Advanced"; Agenda Item: 15.5; R1-091489; 3GPP TSG RAN WG1 Meeting #56bis, Seoul, Korea, Mar. 23-27, 2009 (Original R1-083684); [Ref.: EESR mailed Jul. 6, 2011].
Samsung; "Antenna Switching Transmission of RACH Preamble"; Agenda Item: 6.4.3; R1-062517; 3GPP RAN WG1 #46bis, Seoul, Korea, Oct. 9-13, 2006; [Ref.: EESR mailed Jul. 6, 2011].
ETRI; "Reliable transmission of 1st UL message in random access"; Agenda Item: 6.5.1; R1-063518; 3GPP TSG RAN WG1 Meeting #47, Riga, Latvia, Nov. 6-10, 2006; [Ref.: EESR mailed Jul. 6, 2011].
ETRI; "Random Access Transmit Diversity"; Agenda item: 4.1; R1-061829; 3GPP TSG RAN WG1 LTE Ad Hoc, Cannes, France, Jun. 27-30, 2006; [Ref.: EESR mailed Jul. 6, 2011].
Notice of Rejection issued for corresponding Japanese Patent Application No. 2007-333849, dispatch date Mar. 18, 2014, with a full English translation.

\* cited by examiner

COMMUNICATION METHOD, USER EQUIPMENT AND RADIO BASE STATION IN RADIO COMMUNICATION SYSTEM

CROSS REFERENCE TO RELATED APPLICATION(S)

This application is based on and hereby claims priority to Japanese Application No. 2007-333849 filed on Dec. 26, 2007 in Japan, the entire contents of which are hereby incorporated by reference.

BACKGROUND (1) Field

The embodiments discussed herein are directed to a communication method, a user equipment and a radio base station in a radio communication system. The embodiments may be used in communication when the user equipment randomly accesses the radio base station so as to establish a radio link, for example.

(2) Description of Related Art

There is a case in which a Random Access CHannel (RACH) is used as a method for a User Equipment (UE) to establish the radio link with a Base Station (BS), in the radio communication system.

A sequence in which the UE performs a cell search and is allowed to transmit the RACH signal in the Long Term Evolution (LTE) specification being discussed in the 3GGP is depicted in FIG. 21. Meanwhile, the cell search is disclosed in the Section 5.1.7.3 of Non-Patent Document 1 to be described below.

The BS 100 cyclically transmits each signal of a Synchronous CHannel (SCH), a Reference Signal (RS), and a Broadcast CHannel (BCH) as a downlink (DL) signal.

Herein, the SCH is the channel used for an initial cell search by the UE, and a primary SCH (P-SCH) and a secondary SCH (S-SCH) are defined such that the UE 400 can hierarchically identify a pattern of the RS to be used to estimate the downlink propagation channel.

The RS is a signal corresponding to a common pilot signal used for an existing W-CDMA system and is a known signal (pattern) between the BS 100 and the UE 400 used for estimating the downlink propagation channel.

A plurality of RS patterns are prepared, and are grouped into a plurality of groups for the hierarchical pattern identification. That is to say, it becomes possible to identify the group of the RS patterns by information of the P-SCH and to identify the RS patterns belonging to the group by the information of the S-SCH.

The BCH is a channel used for transferring information to be notified from the BS 100 to the UE 400, such as information regarding the RACH preamble.

Upon receiving the P-SCH and the S-SCH cyclically transmitted from the BS 100, the UE 400 firstly identifies the group to which the RS patterns transmitted by the BS 100 belong based on the information of the P-SCH, and secondly identifies the RS patterns out of the group identified based on the information of the S-SCH.

Then, the UE 400 estimates the DL propagation channel from the BS 100 using the identified RS pattern, receives the BCH to collect the BS information, and recognizes a transmittable series of the RACH preamble and timing thereof. Thereby, the UE 400 is allowed to transmit the RACH preamble for establishing an initial connection, as needed.

Meanwhile, the sequence as described above is similar to that in an existing W-CDMA system. Also, regarding the transmission of the SCH, a technique referred to as Precoding Vector Switching (PVC) is discussed in the LTE, refer to Non-Patent Document 2 to be described below. This will be described in detail below.

[Non-Patent Document 1] 3GGP TS 36.300 V8.2.0[online], Oct. 5, 2007, 3rd Generation Partnership Project (3GPP), [searched on Dec. 11, 2007], Internet <URL: http://www.3gpp.org/ftp/Specs/html-info/36300.htm>

[Non-Patent Document 2] 3GPP TSG RAN WG1 Meeting #48 bis (R1-071630), NTT DoCoMo, Fujitsu, et al., "Transmit Diversity Scheme for SCH in E-UTRA", Mar. 26-30, 2007

Since the RACH preamble is used by the UE to perform uplink (UL) transmission to the BS for the first time for establishing the initial connection, the BS does not receive the signal to estimate the UL propagation channel such as the DL RS before receiving the RACH preamble. Therefore, there is a case in which the reception quality of the RACH preamble in the BS is degraded.

SUMMARY

This specification discloses "Communication Method, User equipment and Radio Base Station in Radio Communication System" to be described hereinafter.

(1) That is say, a communication method disclosed herein is a communication method for a radio communication system, the system having a user equipment and a radio base station, which transceives information with the user equipment using multi-beams, the method including: transmitting information for the radio base station from the user equipment to the radio base station selectively using either of radio resources associated with the individual multi-beams, and performing reception processing of the radio resources for the individual multi-beams at the radio base station.

(2) The radio resource used herein may be radio resource of a frequency divided or time domain divided uplink random access channel, or radio resource of an access slot obtained by dividing the radio resource of the random access channel by encoding.

(3) Herein, the radio resource with which the user equipment transmits the information may be selected based on reception quality of the individual beams of the information received from the radio base station using the multi-beams.

(4) Also, the reception processing of the radio base station may include reception beam forming using a weighting coefficient the same as that used for forming the multi-beams.

(5) Further, a user equipment disclosed herein is a user equipment for a radio communication system, the system having the user equipment and a radio base station, which transceives information with the user equipment using multi-beams, the user equipment including: selection means to select either of radio resources associated with the individual multi-beams; and transmitting means to transmit information to the radio base station using the selected radio resource.

(6) Herein, the selection means may select the radio resource with which the information is transmitted, based on reception quality of the individual beams of the information received from the radio base station using the multi-beams.

(7) In addition, the selection means may have a memory, which holds correspondence between the multi-beams and the radio resources, which is used for the selection.

(8) Further, the user equipment may further be provided with setting means for receiving the correspondence from the radio base station and setting the correspondence to the memory.

(9) Also, a radio base station disclosed herein is a radio base station for a radio communication system, the system having a user equipment and the radio base station, which transceives information with the user equipment using multi-beams, the radio base station including: transmitting means to transmit the information to the user equipment using the multi-beams; and receiving means to detect information transmitted from the user equipment using either of radio resources associated with the individual multi-beams, by performing reception processing of the radio resources for the individual multi-beams.

(10) Herein, the receiving means may be provided with a detector to detect reception of the information transmitted by the user equipment using the radio resources in any of the reception processing of the radio resources for the individual received multi-beams, and a response information generator to generate response information for the user equipment to transmit the information to the user equipment upon detection of the reception in the detector.

The above and other objects and features of the present invention will be understood by reading carefully the following description with accompanying drawings. Preferred embodiments of the present invention will be described in more detail referring to the accompanying drawings. The drawings are illustrative and are not to be limitative of the scope of the present invention.

DESCRIPTION OF EMBODIMENT(S)

Hereinafter, an embodiment is described with reference to the drawings. However, the embodiment to be described hereinafter is no more than an illustration, and is not intended to preclude application of various modifications and technology not clearly depicted below.

(1) Outline

In a radio communication system such as an OFDM, an OFDMA and a W-CDMA, it is possible to improve reception sensitivity of communication between a BS being a radio base station and a UE being a user equipment by using a high-performance receiving method such as Minimum Mean Square Estimation (MMSE) by referring to an RS of propagation channel estimation-use.

On the other hand, as described above, it is not possible to apply the RS to a UL RACH preamble. Therefore, as a method for improving a reception quality of the RACH preamble in the BS, series judgment may be performed by synthesizing power among a plurality of receiving antennas; however, in a case in which a propagation channel loss is large, this might be insufficient.

On the other hand, in the 3GPP, in the LTE specification, technique referred to as PVS, which cyclically switches a beam for transmitting the SCH for an initial cell search for the UE to establish DL synchronization, or in detail, cyclically changes a weighting coefficient to be multiplied to the SCH for beam forming, has been discussed, the detail is referred to Non-Patent Document 1.

Figure 1:
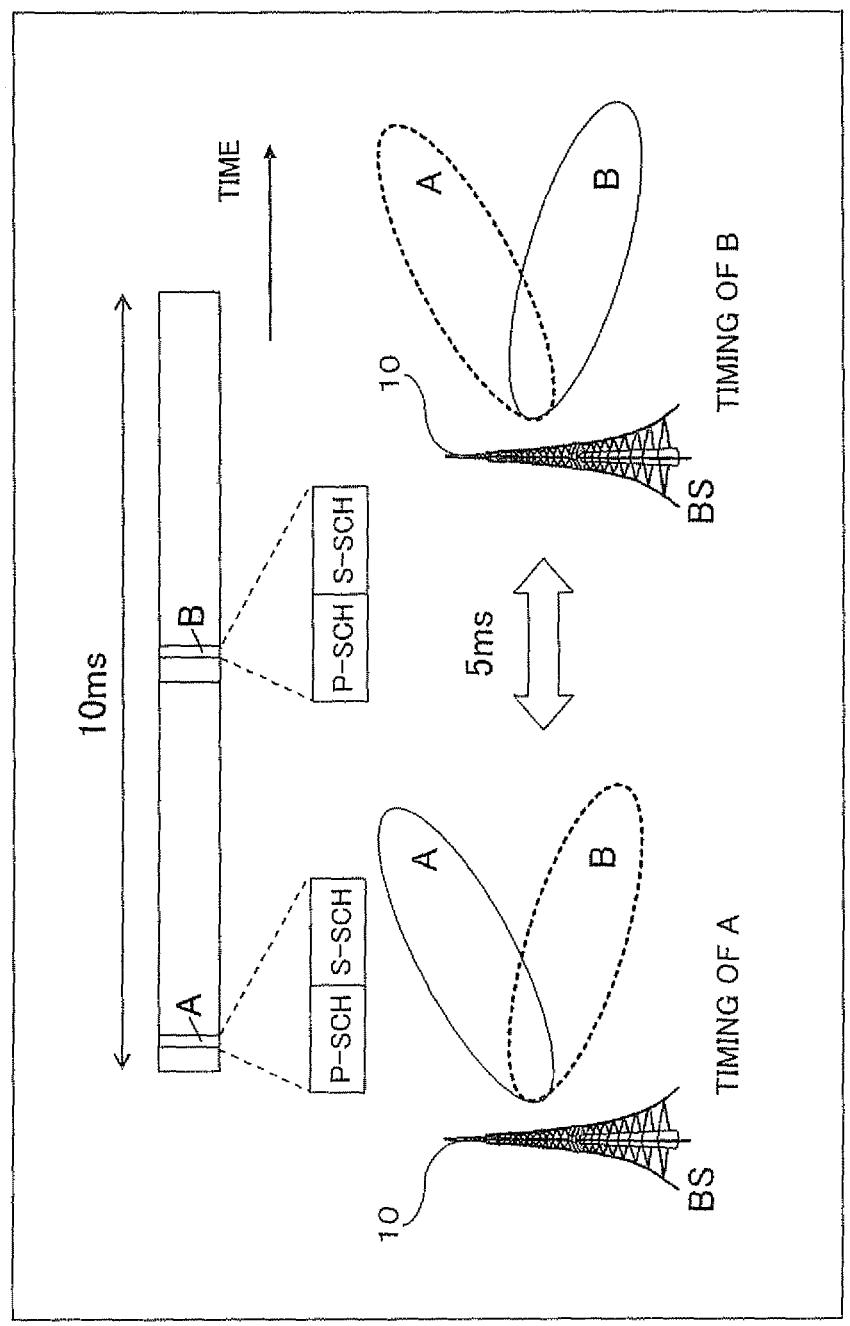
FIG. 1 is a schematic diagram for illustrating an outline of PVS.

This is, as schematically depicted in FIG. 1, for example, a technique to insert a P-SCH and a S-SCH in a group to each time period of a first portion, first half portion is 5 ms, and a second portion, latter half portion is 5 ms, of a radio frame of a predetermined cycle, a example is 10 ms cycle, in a BS 10, and multiply different weighting coefficients to the first half portion and the latter half portion, to form beams of different antenna directivities, and transmit the beams by cyclically every 5 ms switching in time domain. Meanwhile, herein, for the sake of convenience of the description, the beam for transmitting the first half portion and the beam for transmitting the latter half portion are represented as a beam A and a beam B, respectively.

In this way, it is possible to stochastically increase the number of UE capable of receiving the SCH at one time, as compared to a case of fixedly transmitting the SCH by an omni beam. Also, it is possible to average a usage rate of a transmitting power amplifier provided to the BS 10 for each transmission antenna, thereby improving utilization efficiency thereof.

Meanwhile, the radio frame is a radio frame in the OFDM, OFDMA system or the like, for example. Also, the cycle may be appropriately extended to several tens of ms.

In a case of applying such PVS technique, the UE can receive the SCH of different beams at different times, according to a position and a propagation environment thereof. Therefore, the UE is allowed to improve the reception quality of the UL RACH preamble in the BS 10, by comparing reception quality of each beam and requesting the BS 10 to receive the RACH preamble using the beam of which reception quality is good.

Figure 2:
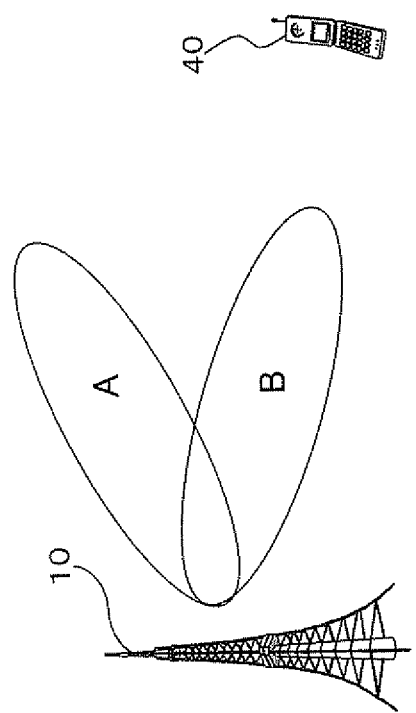
FIG. 2 is a schematic diagram for illustrating an outline of propagation channel estimation in a UE in the PVS.

For example, as schematically depicted in FIG. 2, the BS 10 transmits the SCH by switching the beams A and B every 5 ms by the PVS in a 10 ms interval, and the UE 40 cancels a pattern of the received SCH and electrifies the same thereafter, and compares received power of the beam A and that of the beam B, thereby judging which of the beams has a smaller propagation channel loss. Meanwhile, not only the received power but also a received Signal to Noise Ratio (SNR) and a received Block Error Rate (BLER) or the like may be applied as an index for judging the quality of the propagation channel.

Then, if the UE 40 can notify the BS 10 that the RACH preamble is preferred to be received using the beam of which propagation channel loss is smaller when transmitting the same, the BS 10 may receive the RACH preamble from the UE 40 using the beam of which propagation channel loss is small, so that this may improve the reception quality of the RACH preamble.

Case 1: Usage of RACH Access Slot Number

Figure 3:
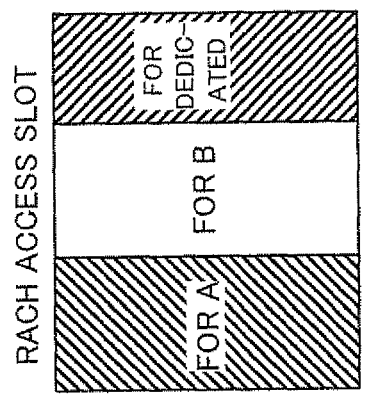
FIG. 3 is a schematic diagram for illustrating a usage 1 of an RACH access slot.

As one of the methods for the UE 40 to specify the BS of the beam of which propagation channel loss is smaller when transmitting the RACH preamble to the BS 10 in this manner, an access slot number of the RACH preamble may be used, for example, as depicted in FIG. 3 and in Table 1. The access slot of the RACH preamble is one of UL radio resources, more specifically, one of the access slots obtained by dividing the radio resources of the RACH preamble by encoding, and this slot is identified with a predetermined code such as a scramble code, for example.

TABLE 1

Usage 1 of RACH Access Slot Number

| RACH Access Slot Number | Application |
| --- | --- |
| 1 to 24 | Initial (beam A) |
| 25 to 48 | Initial (beam B) |
| 49 to 64 | Dedicated |

That is to say, supposing that the number of RACH access slots is 64, out of the 64 slots, for example, 1st to 48th RACH access slots and remaining 49th to 64th RACH access slots are grouped as the slots which the UE 40 uses for an initial connection, and the slots which the UE 40 uses for a dedicated connection, respectively. And out of the 1st to 48th RACH access slots for the initial connection, for example, 1st to 24th RACH access slots and remaining 25th to 48th RACH access slots are grouped as the slots requesting the RACH preamble reception using the beam A and the slots requesting the RACH preamble reception using the beam B, respectively.

Then, the UE 40 selects any one of the 1st to 24th RACH access slot numbers if this requests the BS 10 of the RACH preamble reception using the beam A, and selects any one of the 25th to 48th RACH access slot numbers if this requests the BS 10 of the RACH preamble reception using the beam B, and transmits the RACH preamble using the selected slot. The selection herein may be made randomly, or according to some predetermined rule.

By grouping the RACH access slots for the individual beams as described above, the RACH access slot in this embodiment has the meaning as a connection request from the UE 40 to the BS 10 and the meaning that the UE 40 notifies the BS 10 of the preferred or optimal beam with which the BS 10 receives the RACH preamble.

Meanwhile, the 49th to 64th RACH access slots for dedicated connection are the slots, which may be dedicatedly allocated to the UE 40, for example when the UE 40 performs a hand over (HO) for switching connection to the target BS 10, or when this transmits a scheduling request (SR).

Figure 5:
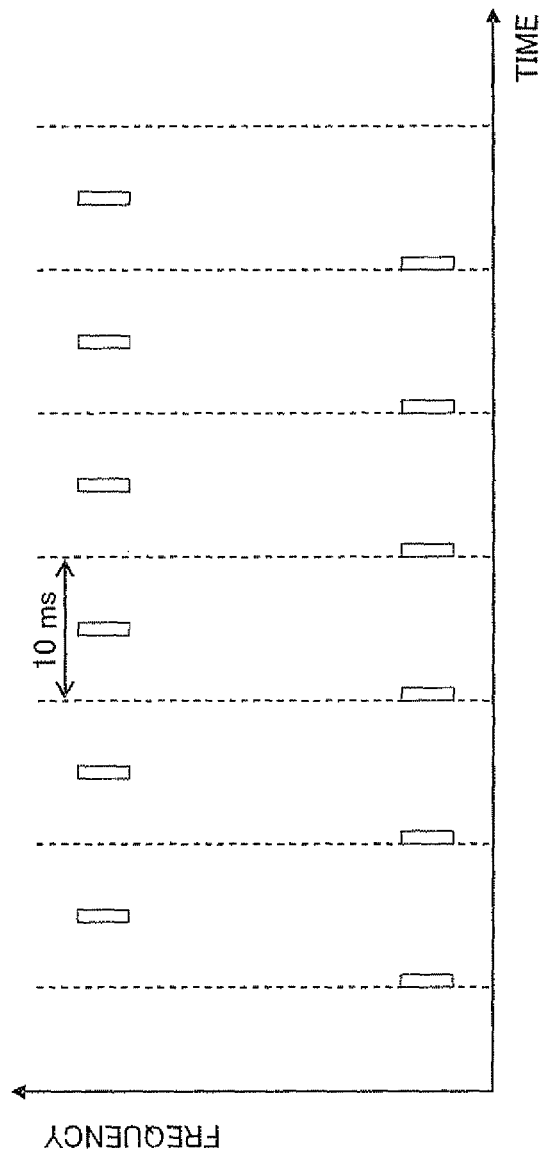
FIG. 5 is a view illustrating a transmission format example of the RACH preamble.
Figure 6:
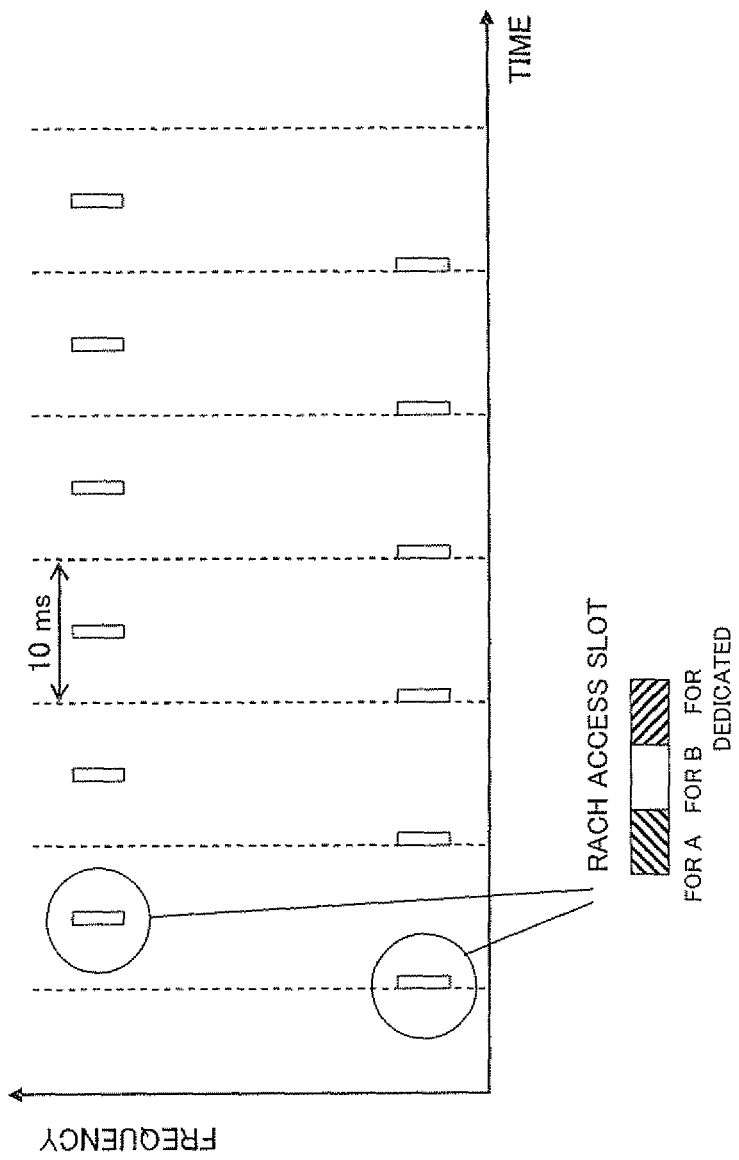
FIG. 6 is a view illustrating positioning of the RACH access slot in the transmission format depicted in FIG. 5.

Also, an example of a transmission format of the RACH preamble is depicted in FIG. 5. This format is notified by the BS 10 to the UE 40 in the BCH, for example. In a non-limiting example depicted in FIG. 5, a quality in which there are two transmission opportunities of the RACH Preamble in the interval of 10 ms and different frequencies are used in each of the transmission opportunities due to frequency hopping is depicted. In each of the transmission opportunities, as depicted in FIG. 6, for example, there are a plurality of RACH access slots. That is to say, it is only requested that the RACH access slot is one of the frequency divided or time domain divided UL radio resources.

Case 2: Usage of RACH Access Slot Number

As another method, for example, as depicted in Table 2, it is possible to group, out of the 1st to 48th RACH access slots for the initial connection, odd-number RACH access slots as the slots requesting the BS 10 of the RACH preamble reception using the beam A, and even-number RACH access slots as the slots requesting the BS 10 of the RACH preamble reception using the beam B.

TABLE 2

Usage 2 of RACH Access Slot Number

| RACH Access Slot Number | Application |
| --- | --- |
| 1, 3, 5, . . . , 23 | Initial (beam A) |
| 2, 4, 6, . . . , 48 | Initial (beam B) |
| 49 to 64 | Dedicated |

In this case, the UE 40 selects any one of the odd-number access slot numbers if this requests the BS 10 of the RACH preamble reception using the beam A, and selects any one of the even-number access slot numbers if this requests the BS 10 of the RACH preamble reception using the beam B, and performs the RACH preamble transmission. Meanwhile, a method of grouping the RACH access slots for the initial connection for the individual beams is not limited, and grouping other than that by the even number and odd number may be performed.

Case 3: Usage of RACH Access Slot Number

Also, the number of beams of the SCH transmitted by the BS 10 is not limited to two, and there is a case of three beams or more. For example, when the number of beams to be transmitted by the BS 10 is four, it is possible that the usage of the RACH access slots is grouped as depicted in Table 3.

TABLE 3

Usage 3 of RACH Access Slot Number

| RACH Access Slot Number | Application |
| --- | --- |
| 1 to 12 | Initial (beam A) |
| 13 to 24 | Initial (beam B) |
| 25 to 36 | Initial (beam C) |
| 37 to 48 | Initial (beam D) |
| 49 to 64 | Dedicated |

Herein, when the four beams are distinguished as the beams A, B, C and D, out of the 1st to 48th RACH access slots for the initial connection, it is possible to group the 1st to 12th RACH access slots as the slots requesting the BS 10 of the RACH reception using the beam A, the 13th to 24th RACH access slots as the slots requesting the BS 10 of the RACH reception using the beam B, the 25th to 36th RACH access slots as the slots requesting the BS 10 of the RACH reception using the beam C, and the 37th to 48th RACH access slots as the slots requesting the BS 10 of the RACH reception using the beam D, respectively.

In this case, the UE 40 selects any one of the RACH access slot numbers corresponding to any of the beams A to D of which reception quality is good or optimal out of the received four beams A to D, and performs the RACH transmission to the BS 10 by the selected slot.

Meanwhile, when the radio frame depicted in FIG. 1, for example is assumed, the four beams A to D may be formed by applying different weighting coefficients in each of the beam forming of the SCH transmitted two times in the interval of two radio frames (20 ms), and in this example, beam switching is performed among different beams every 5 ms.

Case 4: Usage of RACH Access Slot Number

Figure 4:
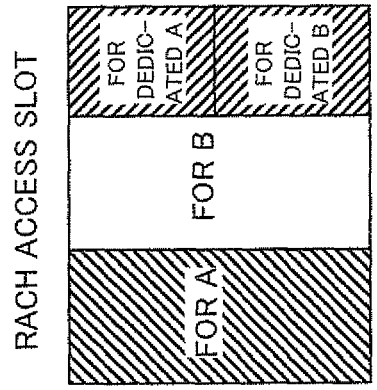
FIG. 4 is a schematic diagram for illustrating a usage 2 of the RACH access slot.

In addition, regarding the dedicated RACH access slots dedicatedly allocated to the UE for use as a HO also, it is possible to group for the individual beam, as depicted in FIG. 4 and Table 4, for example.

TABLE 4

Usage 4 of RACH Access Slot Number

| RACH Access Slot Number | Application |
|---|---|
| 1 to 24 | Initial (beam A) |
| 25 to 48 | Initial (beam B) |
| 49 to 56 | Dedicated (beam A) |
| 57 to 64 | Dedicated (beam B) |

That is to say, in an example depicted in FIG. 4 and Table 4, out of the 49th to 64th RACH access slots for dedicated connection, it is possible to group the 49th to 56th RACH access slots as the slots requesting the BS 10 of the RACH preamble reception using the beam A, and the remaining 57th to 64th RACH access slots as the slots requesting the BS 10 of the RACH preamble reception using the beam B, respectively.

In this case, when the BS 10 dedicatedly allocates the RACH access slot numbers for the individual UE 40 for use as the HO or the like, by allocating a group of the slot numbers like beam A to 49th and beam B to 57th, the UE 40 is allowed to specify the beam with which the RACH preamble reception is desired, by the RACH access slot number to be transmitted with respect to a HO source BS 10 and a HO target BS 10. Therefore, it is possible to improve the reception quality of the RACH preamble not only at the initial connection but also when using the dedicated RACH access slot.

Case 4: Usage of RACH Access Slot Number

Meanwhile, although the above-described example is the method for specifying the received beam of the RACH preamble in the BS 10 in units of 64 RACH access slot numbers in each transmission opportunity of the RACH preamble, it is also possible to specify the received beam of the RACH preamble in the BS 10 for the individual transmission opportunities of the RACH preamble.

Figure 7:
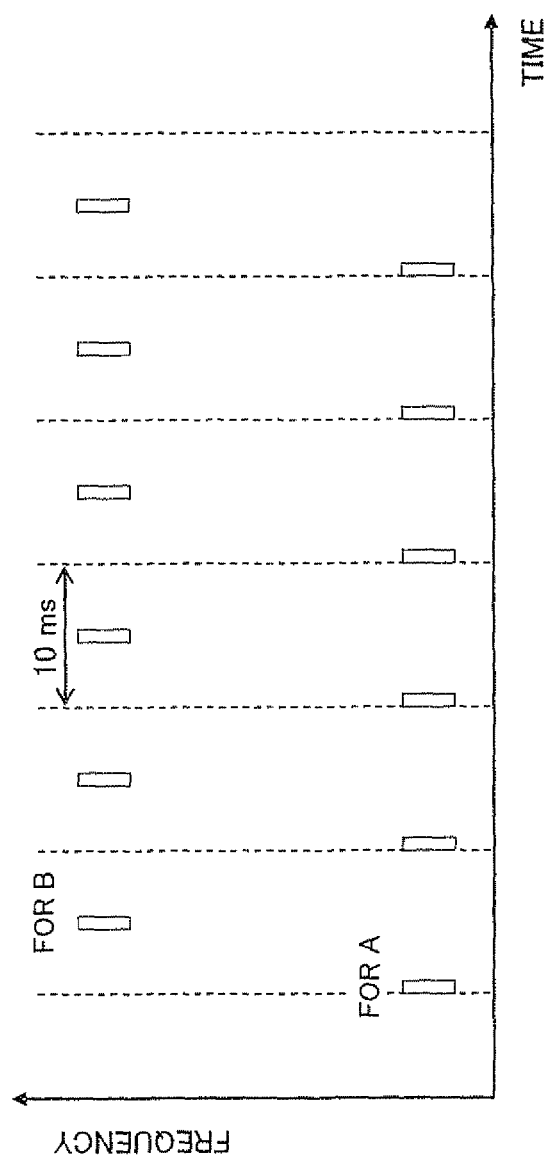
FIG. 7 is a view illustrating a usage 5 of the RACH access slot.

For example, as depicted in FIG. 7, in a case in which there are two transmission opportunities of the RACH preamble in the interval of 10 ms and different frequencies are used in each transmission opportunity due to the frequency hopping, it is possible to determine that one transmission opportunity is that in which the RACH preamble reception using the beam A is requested, and the other transmission opportunity is that in which the RACH preamble reception using the beam B is requested, respectively, by the UE 40 to the BS 10.

In this example, instead of associating the RACH access slot number and the received beam in the BS 10 in an upper layer and commonly recognizing the association between the BS 10 and the UE 40, the transmission opportunity of the RACH preamble and the received beam in the BS 10 may be associated and commonly recognized by the BS 10 and the UE 40.

RACH PREAMBLE Reception Processing in BS 10:

Next, an outline of the RACH PREAMBLE reception processing in the BS 10, in a case in which the UE 40 selects the RACH access slot number based on the beam reception quality of the SCH as described above to RACH PREAMBLE-transmit to the BS 10, is described.

Figure 8:
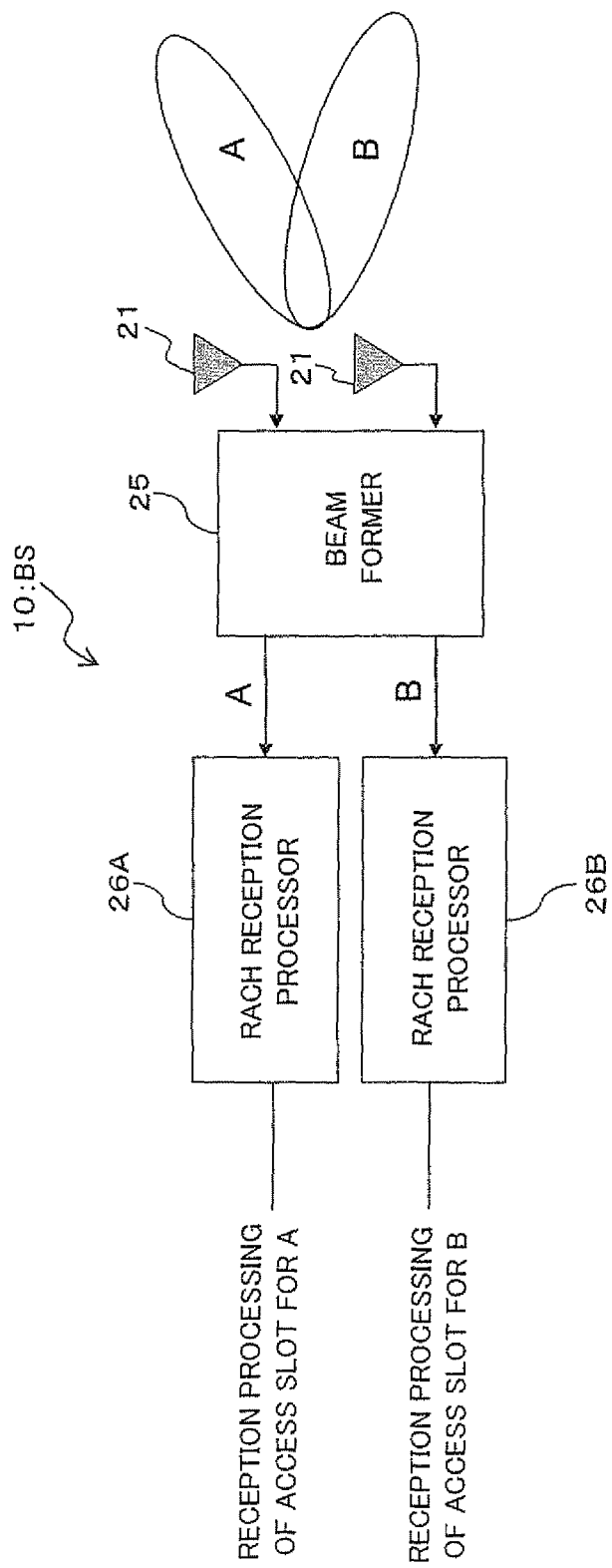
FIG. 8 is a block diagram illustrating an outline of RACH reception processing in the BS.

As depicted in FIG. 8, the BS 10 is provided with, for example, a plurality of receiving antennas 21, a beam former 25, and RACH reception processors 26A and 26B of the number depending on the number of beams like A and B, transmitted by the BS 10. A signal received by the receiving antenna 21 is separated into the received signal of the beam A and the received signal of the beam B, by a received beam processing with weighting coefficients each used for forming of the beams A and B for transmitting the SCH, in the beam former 25.

The separated received signals are input to corresponding RACH reception processors 26A and 26B, respectively, and the RACH reception processor 26A performs detection process of the RACH access slot number grouped as that for one beam A, and the RACH reception processor 26B performs the detection process of the RACH access slot numbers grouped as that for the other beam B.

That is to say, the BS 10 performs the detection process in units of slots with respect to the RACH access slot grouped for the individual beams. Therefore, the number of detection processes of the RACH access slot is not different from the conventional one, so that the processing amount is not increased.

Figure 9:
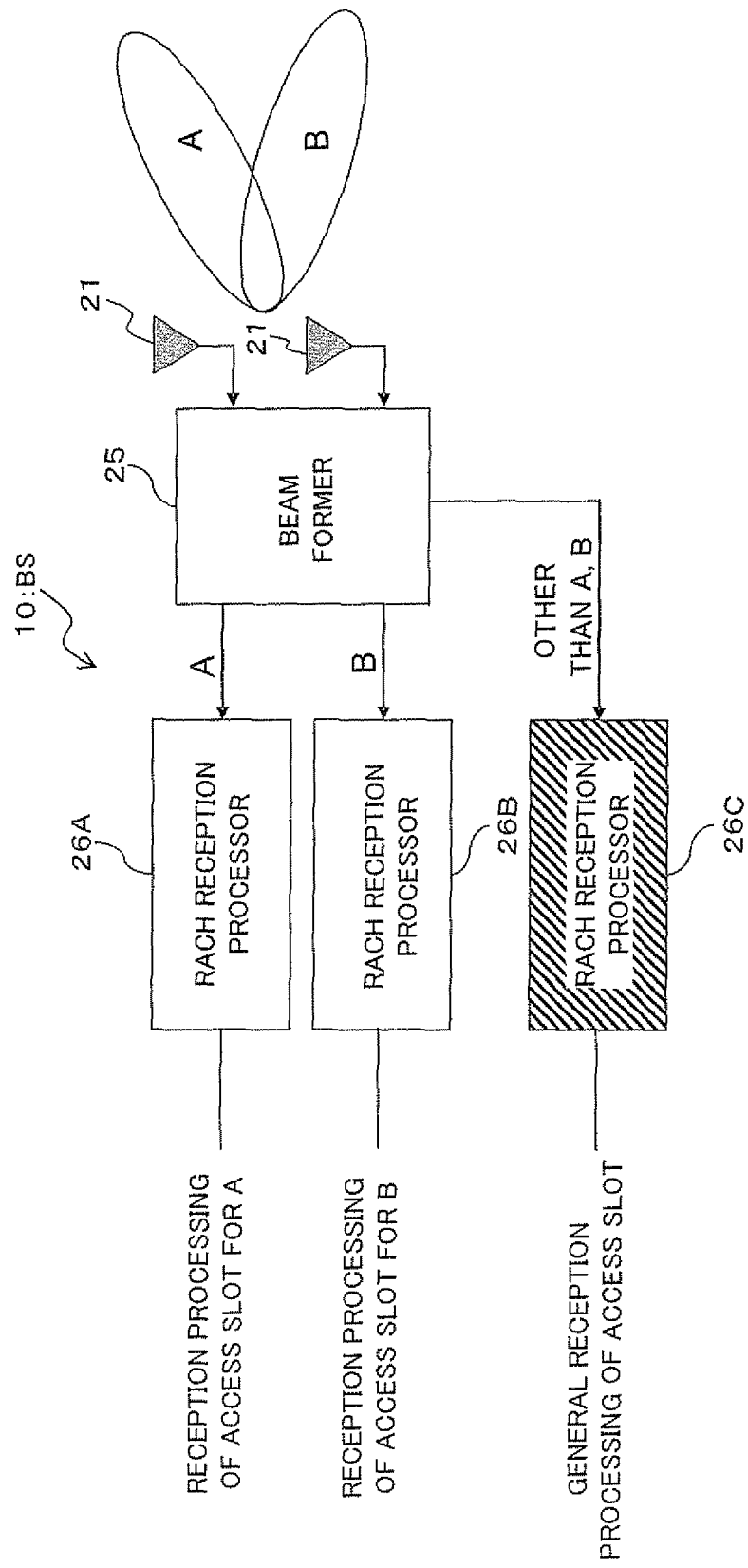
FIG. 9 is a block diagram illustrating an outline of a variant of the RACH preamble reception processing.
Figure 10:
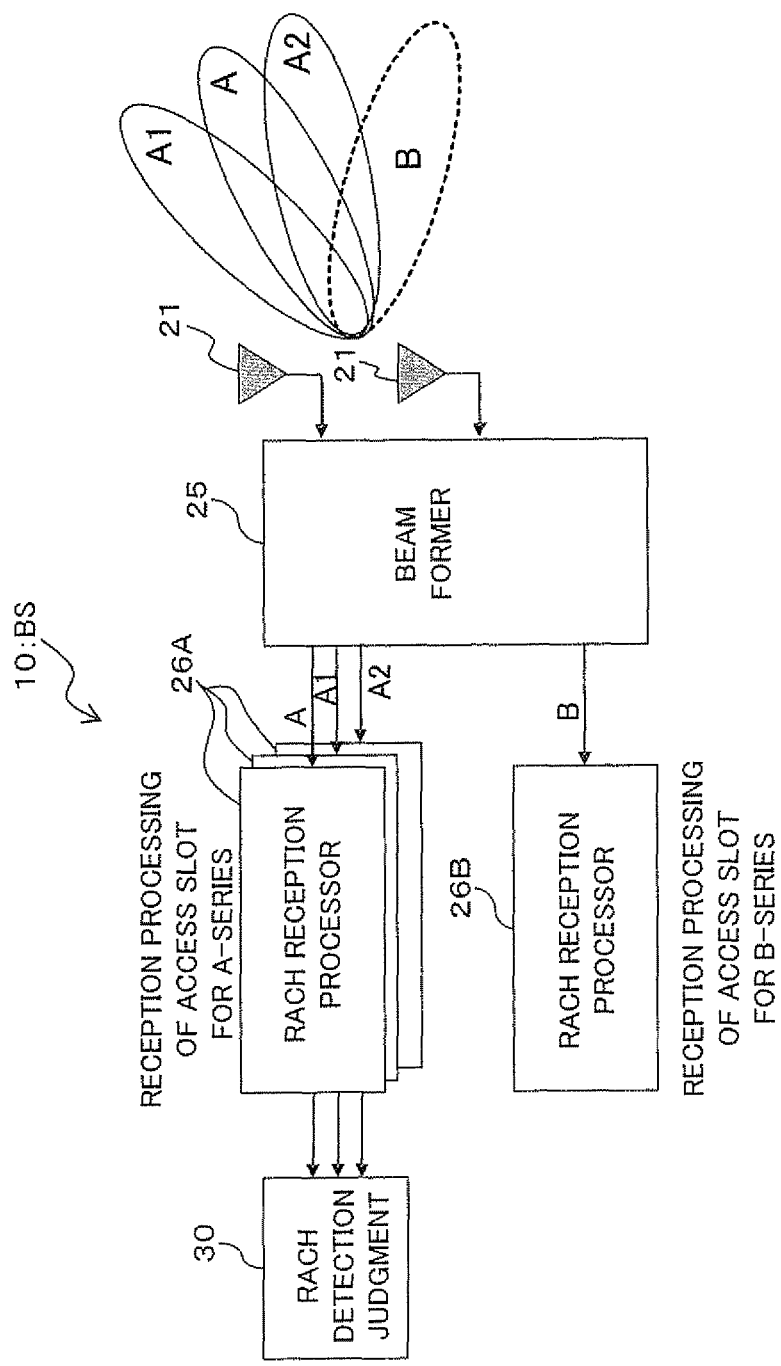
FIG. 10 is a block diagram illustrating an outline of another variant of the RACH preamble reception processing in the BS.

Meanwhile, the BS 10 may be configured, for example, as depicted in FIG. 9 or FIG. 10.

The BS 10 depicted in FIG. 9 is obtained by additionally providing a RACH reception processor 26C, is indicated shadow area, for performing the existing RACH preamble reception processing for the RACH access slot other than the beams A and B to the configuration in FIG. 8.

In the configuration depicted in FIG. 9, the received signal other than the beams A and B is separated without performing the reception beam forming in the beam former 25, and the reception processing is performed to the same in the RACH reception processor 26C. The signal to be processed in the RACH reception processor 26C is a dedicated RACH access slot numbers depicted in Table 1, for example.

On the other hand, the BS 10 depicted in FIG. 10 forms, in addition to the beam used for transmitting the SCH, another beam of which directivity is closer to that of the beam and performs the reception processing of a specific RACH access slot by the beams.

For example, in an example depicted in FIG. 10, regarding the beam A used for transmitting the SCH, two beams A1 and A2 of which directivities are closer to that of the beam A are formed, and the detection process of the RACH access slot grouped as that for the beam A, with respect to each of three beams A, A1 and A2. That is to say, in this example, any adjacent plurality of multi-beams formed by the BS 10 by the PVS are associated with the RACH access slot numbers for the same beam A.

Therefore, the BS 10 is provided with three RACH reception processors 26A so as to correspond to the beams A, A1 and A2. Then, a RACH detection judger 30 judges at which of the units the reception of the RACH preamble is detected.

This is obtained by forming a plurality of beams A, A1 and A2 regarding a series of the beam A used for transmitting the DL SCH in advance to perform the reception processing, and correcting an error by the beams A, A1 and A2, thereby tuning so as to select the preferred or optimal propagation channel on the assumption that error might occur for estimating the UL propagation channel opposite to the DL propagation channel.

The one, which could select the optimal propagation channel, has the highest detection capability, so that in the RACH detection judger 30, it is judged whether the RACH preamble reception is detected in any of a plurality of RACH reception processors 26A.

Meanwhile, although an example depicted in FIG. 10 shows an image in which the RACH preamble reception processing is performed with a plurality of beams only for the series of beam A, it is also possible to alternatively or additionally perform similar RACH preamble reception processing for the series of other beam B. Also, the number of supplemental beams formed with respect to the beam A for transmitting the SCH is not limited to two, and this may be one or three or larger.

Estimating Timing of the Propagation Channel:

Next, timing that the UE 40 estimates the DL propagation channel is described with reference to FIG. 11.

The SCH is the channel for the UE 40 to establish DL synchronization with the BS 10, so that this is a kind of a broadcasted channel, and is cyclically transmitted from the BS 10, as described above.

In general, the UE 40, upon receiving information of the BCH after power activation or the like, transmits the RACH preamble signal for registering subscriber information or the like of its own equipment station 40 to a Home Subscriber Server (HSS) through a Mobility Management Entity (MME) in a case of the LTE, for example. At that time, this may apply a beam receiving method by the RACH access slot number specification in this proposal. FIG. 11 shows a preferred method for the DL propagation channel estimating in such a case.

Figure 21:
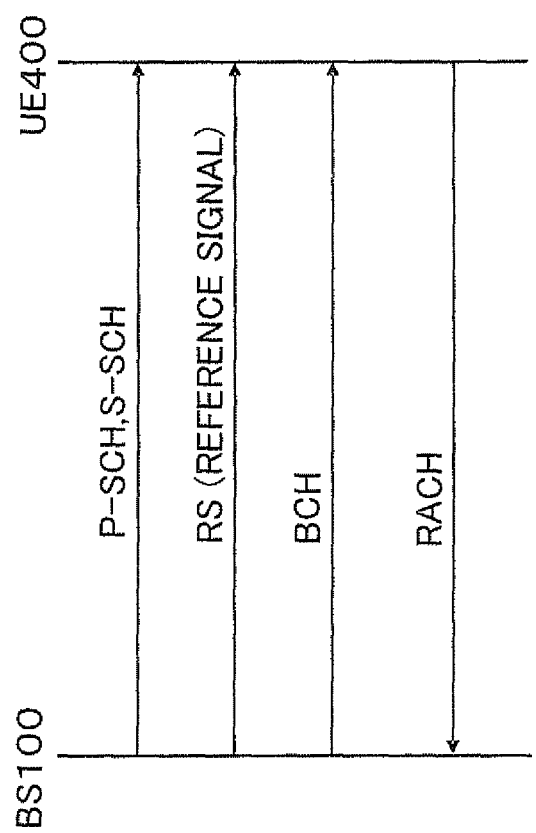
FIG. 21 is a sequence diagram for illustrating a process until the conventional UE performs the RACH preamble transmission.

Although the UE 40 estimates the DL propagation channel by using the initially received SCH, regardless the timing of transmitting the RACH preamble, in the sequence of the conventional technology illustrated in FIG. 21, when the time difference with the timing of actually transmitting the RACH preamble thereafter is large, a propagation channel environment might change during this time difference.

Figure 11:
FIG. 11 is a sequence diagram for illustrating timing at which the UE estimates a DL propagation channel.

Therefore, as depicted in FIG. 11, the UE 40 estimates the DL propagation channel by the SCH received at the timing closer to the timing of transmitting the RACH preamble, preferably at the immediately preceding timing. That is to say, it is preferable that the UE 40 adaptively selects the SCH to be used for the DL propagation channel estimating depending on transmission timing of the UL RACH preamble.

Hereinafter, a detailed example of the BS 10 and the UE 40 for realizing a received beam specifying function of the RACH preamble using the above-described RACH access slot number is described. Meanwhile, of course, in the following also, the number of transmitted beams of the SCH is not limited to two.

[2] First Embodiment

Figure 12:
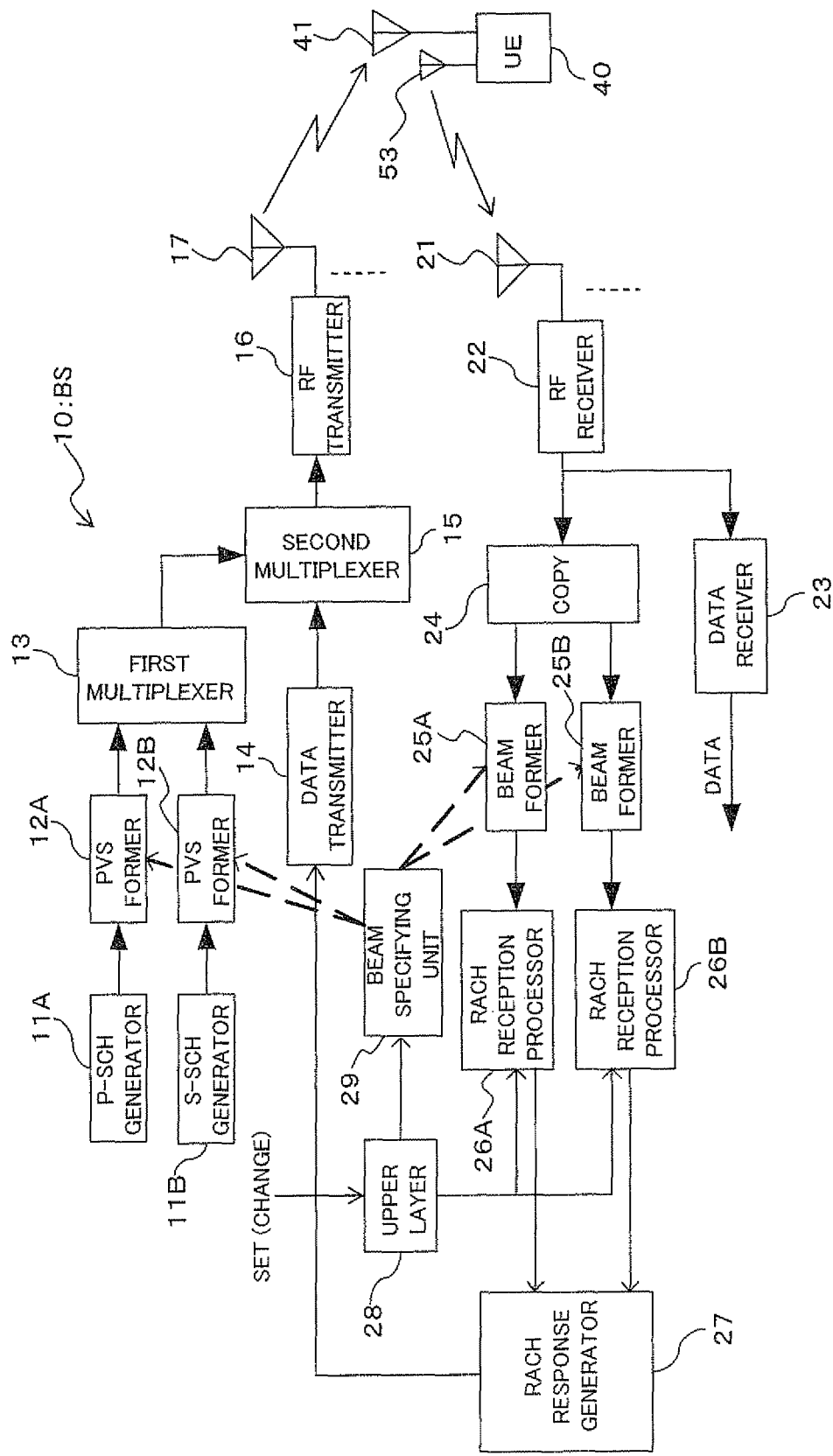
FIG. 12 is a block diagram illustrating a detailed configuration example of the BS according to the first embodiment.
Figure 13:
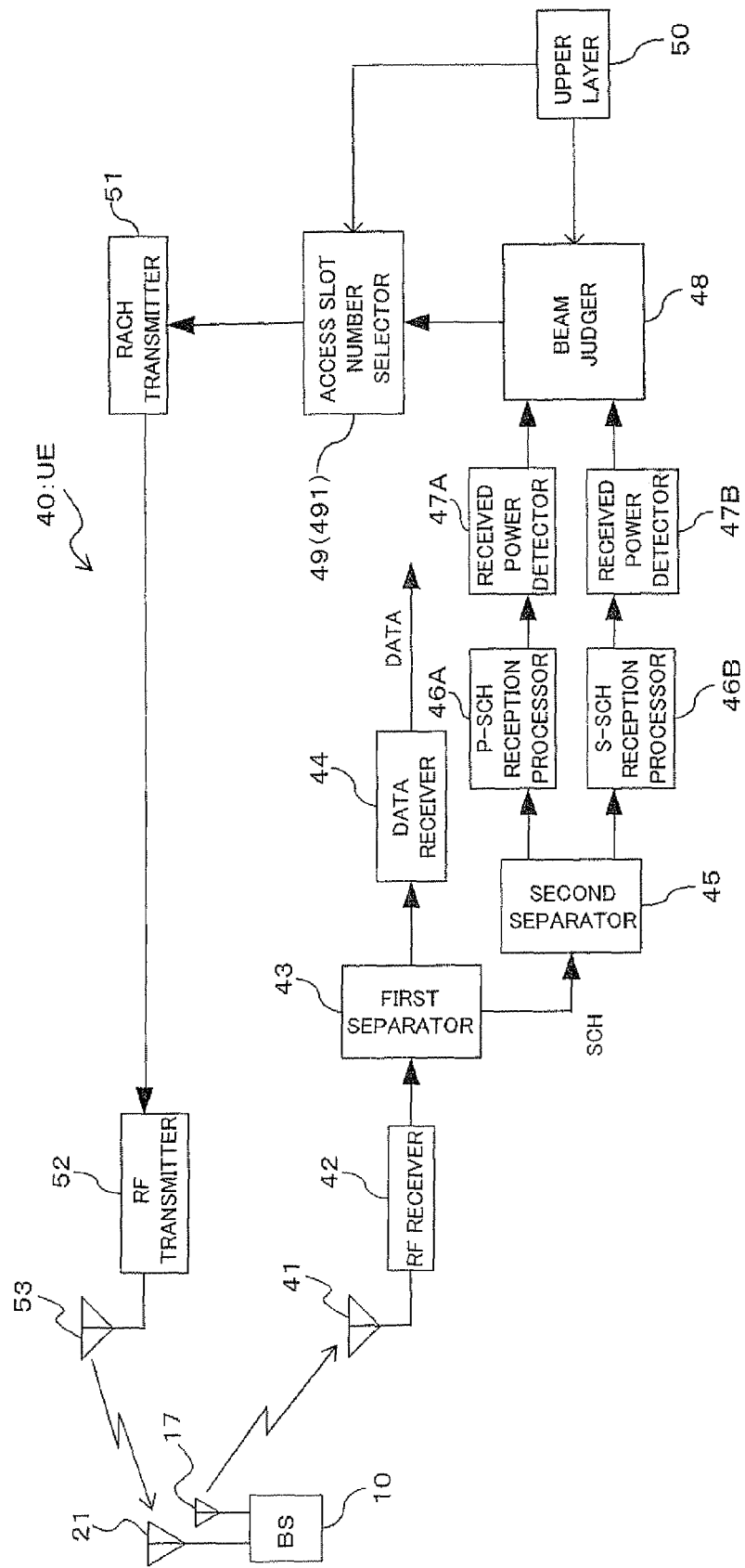
FIG. 13 is a block diagram illustrating a detailed configuration example of the UE according to a first embodiment.

FIG. 12 is a block diagram showing a configuration example of the BS 10, and FIG. 13 is a block diagram showing a configuration example of the UE 40. The configurations depicted in FIGS. 12 and 13 correspond to the implementation example in a case in which the RACH access slot numbers for the initial connection are sorted into two beams A and B, as depicted in Tables 1 and 2.

Regarding BS 10:

The BS 10 depicted in FIG. 12 is provided with, for example, a P-SCH generator 11A, a S-SCH generator 11B, PVS formers 12A and 12B, a first multiplexer 13, a data transmitter 14, a second multiplexer 15, an RF transmitter 16, a plurality of transmitting antennas 17, a plurality of receiving antennas 21, an RF receiver 22, a data receiver 23, a copying unit 24, beam formers reception beam formers 25A and 25B, RACH reception processors 26A and 26B, a RACH response generator 27, an upper layer processor 28, and a beam specifying unit 29.

The P-SCH generator 11A is provided with a function to generate information of the DL P-SCH, and the S-SCH generator 11B is provided with a function to generate the information of the DL S-SCH. The information of the SCH generated in the generators 11A and 11B is input to the corresponding PVS formers 12A and 12B, respectively.

The PVS formers 12A and 12B are provided with a function to form a plurality of beams A and B for cyclically switching the information of the SCH by the PVS to transmit. For example, each of the PVS formers 12A and 12B multiplies a first weighting coefficient for forming a first beam A at the timing corresponding to the first half portion (5 ms) of the radio frame of 10 ms cycle depicted in FIG. 1, and multiplies a second weighting coefficient for forming a second beam B at the timing corresponding to the latter half portion (5 ms), by the information of the P-SCH generated in the P-SCH generator 11A and the information of the S-SCH generated in the S-SCH generator 11B, thereby forming a plurality of beams A and B of the PVS. That is to say, the PVS formers 12A and 12B serve as transmitting means for transmitting the SCH for the UE 10 by forming the multi-beams.

Meanwhile, the preceding vector and the multiplication timing thereof are managed by the upper layer processor 28, for example, and is specified through the beam specifying unit 29, as indicated by an arrow of dotted line.

The first multiplexer 13 time-division-multiplexes the information of the SCH multiplied by the weighting coefficient, so as to insert the same to the first half portion and the latter half portion of the radio frame of 10 ms cycle depicted in FIG. 1, and outputs the same to the second multiplexer 15.

The data transmitter 14 is provided with a function for encoding and modulating as needed DL transmission data other than the SCH.

The second multiplexer 15 time-division-multiplexes the signal of the SCH obtained by the first multiplexer 13 and the DL transmission data other than the SCH obtained by the data transmitter 14, according to a frame format of the radio frame, and outputs the same to the RF transmitter 16.

The RF transmitter 16 performs radio transmission processing such as digital to analogue (DA) conversion, frequency up conversion to a transmission radio frequency, and power amplification to a predetermined transmitted power to the multiplexed signal obtained by the second multiplexer 15.

Each of the transmitting antenna 17 transmits a DL transmission radio signal obtained by the RF transmitter 16 to the UE 40 in a radio zone of the BS 10.

On the other hand, each of the receiving antenna 21 receives the UL radio signal transmitted by the UE 40 in the radio zone of the BS 10.

Meanwhile, a plurality of transmitting antennas 17 and receiving antennas 21 are provided for beam forming.

The RF receiver 22 performs radio reception processing such as low noise amplification, the frequency down conversion to a base band frequency, and analogue to digital (AD) conversion, to the radio signals received by the receiving antenna 21. The received signals to which the radio reception processing is performed are input to the data receiver 23 and the copying unit 24.

The data receiver 23 is provided with a function to demodulate and decode as needed the signal received by the RF receiver 22.

The copying unit 24 copies the signal received by the RF receiver 22 and outputs the same received signals to the beam formers 25A and 25B.

The beam formers 25A and 25B, respectively, perform reception multi beam forming by using the weighting coefficient the same as the weighting coefficient used in the multi beam forming by the PVS.

For example, the beam former 25A multiplies the weighting coefficient the same as one of the weighting coefficients used for forming the beams A and B for transmitting the SCH by the received signal from the copying unit 24 to separate the signal received by the received beam corresponding to one beam A and outputs the same to the RACH reception processor 26A.

Similarly, the beam former 25B multiplies the weighting coefficient the same as the other of the weighting coefficients used for forming the beams A and B for transmitting the SCH by the received signal from the copying unit 24 to separate the signal received by the received beam corresponding to the other beam B, and outputs the same to the RACH reception processor 26B.

Meanwhile, the weighting coefficient for forming the received beam and the multiplying timing thereof also are specified by the upper layer processor 28 through the beam specifying unit 29, as indicated in FIG. 12 by an arrow of dotted line.

The RACH reception processor 26A performs the detection process of the RACH access slot grouped as that for the beam A regarding the received signal of one of the received beams A obtained by the beam former 25A.

Similarly, the RACH reception processor 26B performs the detection process of the RACH access slot grouped as that for the beam B regarding the received signal of the other received beam B obtained by the beam former 25B.

That is to say, the beam formers 25A and 25B and the RACH reception processors 26A and 26B of this embodiment serve as receiving means for detecting the information for establishing the radio link transmitted by the UE 40 using any of the RACH access slots associated with the individual multi-beams by the RACH access slot reception processing for the individual received multi-beams corresponding to the multi-beams.

Meanwhile, the correspondence of the RACH access slots for the beams A and B is managed, for example, by the upper layer processor 28, and the RACH access slot to be detected by the RACH reception processors 26A and 26B is set by the upper layer processor 28.

The RACH response generator 27 generates the RACH response for the UE 40, which transmits the detected RACH preamble, when the reception of the RACH access slot number is detected by anyone of the RACH reception processors 26A and 26B. The RACH response is subjected to the necessary processes at the data transmitter 14, the second multiplexer 15, and the RF transmitter 16, and then transmitted from the transmitting antenna 17 to the UE 40.

As described above, the upper layer processor 28 manages the weighting coefficients used in the PVS generators 12A and 12B and the beam formers 25A and 25B and the multiplying timing thereof and the RACH access slot to be detected by each of the RACH reception processors 26A and 26B, and performs the necessary setting through the beam specifying unit 28 or directly to each processor, as described above.

The beam specifying unit 29 specifies the weighting coefficients used in the PVS generators 12A and 12B and the beam formers 25A and 25B and the multiplying timing thereof according to the instruction from the upper layer processor 28.

Regarding UE 40:

On the other hand, the UE 40 depicted in FIG. 13 is provided with, for example, a receiving antenna 41, an RF receiver 42, a first separator 43, a data receiver 44, a second separator 45, a P-SCH reception processor 46A, an S-SCH reception processor 46B, received power detectors 47A and 47B, a beam judger 48, an access slot selector 49, an upper layer processor 50, an RACH transmitter 51, an RF transmitter 52, and a transmitting antenna 53.

The receiving antenna 41 receives the DL radio signal transmitted by the BS 10 in the radio zone formed by the BS 10. The receiving antenna 41 may be shared with the transmitting antenna 53.

The RF receiver 42 performs the radio reception processing, such as the low noise amplification, the frequency down conversion to the base band frequency, and the AD conversion, to the radio signal received by the receiving antenna 41, and outputs the same to the first separator 43.

The first separator 43 separates the signal of the SCH from the received signal, which is subjected to the radio reception processing in the RF receiver 42, outputs the signal of the SCH to the second separator 45, and outputs the signal other than SCH to the data receiver 44.

The data receiver 44 demodulates and decodes the DL received signal other than the SCH as necessary.

The second separator 45 separates the signal of the SCH from the first separator 43 into the signals of the P-SCH and the S-SCH, and outputs the signals of the P-SCH and the S-SCH to the P-SCH reception processor 46A and the S-SCH reception processor 46B, respectively.

The P-SCH reception processor 46A cancels a pattern of the received P-SCH and outputs the same to a received power detector 47A, and similarly, the S-SCH reception processor 46B cancels the pattern of the received S-SCH and outputs the same to a received power detector 47B.

The received power detector 47A detects the received power of the P-SCH after canceling the pattern thereof, and similarly, the received power detector 47B detects the received power of the S-SCH after canceling the pattern thereof.

The beam judger 48 compares the received power of a group of the P-SCH and the S-SCH at the timing corresponding to the beam A, and the received power of a group of the P-SCH and the S-SCH at the timing corresponding to the beam B to judge the reception quality of the SCH of which beam is optimal. A judgment result is transferred to the access slot selector 49. Meanwhile, the beam to be judged is managed, for example, by the upper layer processor 50, and set by the upper layer processor 50 with respect to the beam judger 48.

The access slot selector 49 holds a definition of the RACH access slot number of each of the beams A and B depicted in Table 1 or 2 in a memory 491 such as a RAM as slot data for the individual beams, which is used for the selection, and selects the RACH access slot number corresponding to the beam A or B of which reception quality is optimal based on the judgment result by the beam judger 48 to notify the RACH transmitter 51 of this.

That is to say, the beam judger 48 and the access slot selector 49 of this embodiment serve as selection means for selecting any of the RACH access slots numbers associated with the individual multi-beams, which may be formed by the BS 10.

Meanwhile, the slot data for the individual beams in Table 1 or 2 is notified from the BS 10 to the UE 40, for example, by using the BCH or the like, and the notified information is processed by the upper layer processor 50 and is set in the memory 491 by the upper layer processor 50. In this case, the upper layer processor 50 serves as setting means for receiving the slot data for the individual beams from the BS 10 and setting the same in the memory 491. However, the slot data for the individual beams may be set in advance in the memory 491.

The RACH transmitter 51 transmits the RACH preamble, which is the information for establishing the radio link with the BS 10 in the RACH access slot selected by the access slot selector 49.

The RF transmitter 52 performs the radio transmission processing such as the DA conversion, the frequency up conversion to the transmission radio frequency, and the power amplification to predetermined transmission power to the RACH preamble.

The transmitting antenna 53 transmits the UL RACH preamble obtained by the RF transmitter 52 to the BS 10. The process in the BS 10, which has received the RACH preamble, is as described above.

Hereinafter, operations focusing on the received beam selection of the RACH preamble by the UE 40 of this embodiment and on the reception processing of the RACH preamble in the BS 10 of this embodiment are described with reference to FIGS. 14 and 15, respectively. Meanwhile, FIG. 14 shows the process in the UE 40 and FIG. 15 shows the process in the BS 10, respectively.

Figure 14:
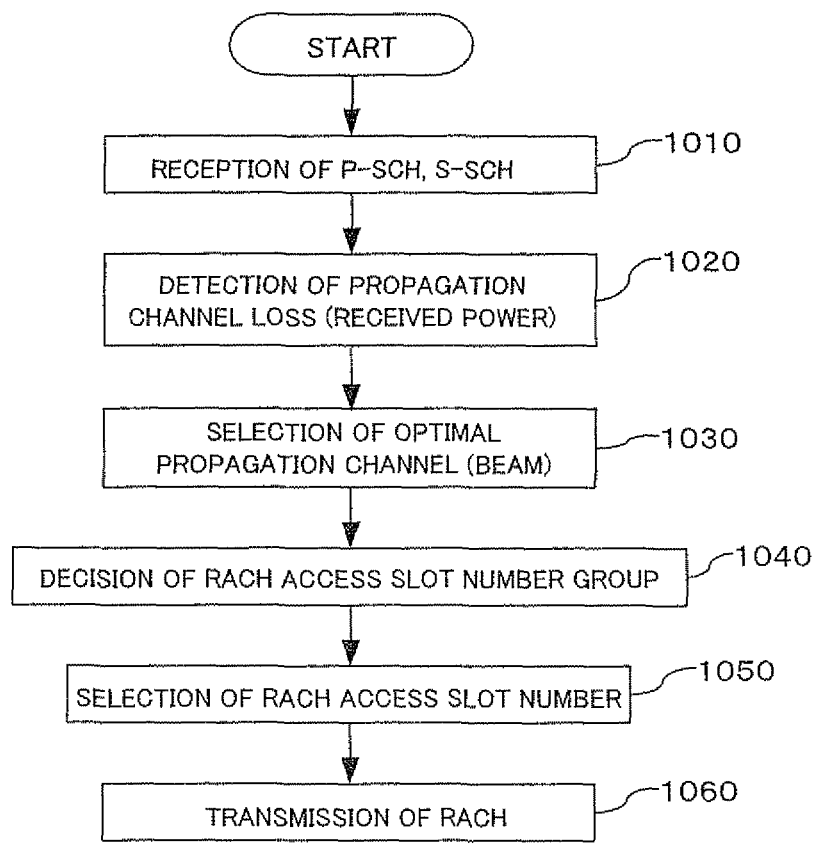
FIG. 14 is a flowchart for illustrating a process in the UE depicted in FIG. 13.
Figure 15:
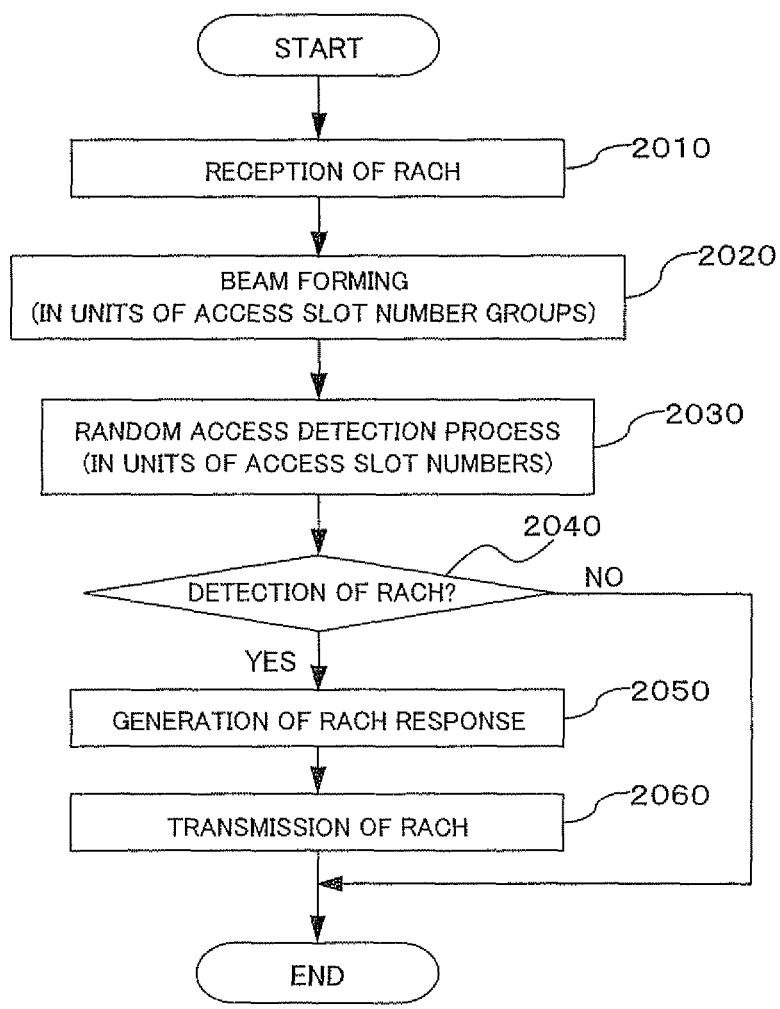
FIG. 15 is a flowchart for illustrating a process in the BS depicted in FIG. 12.

First, as depicted in FIG. 14, in the UE 40, after power activation or the like, when the SCH cyclically transmitted by the BS 10 is received by the receiving antenna 41, the RF receiver 42, the first separator 43, the second separator 45, the P-SCH reception processor 46A, and the S-SCH reception processor 46B (process 1010), the received power of each of the beams A and B is detected in the received power detectors 47A and 47B, respectively (process 1020).

Then, the UE 40 compares each of the detected received power in the beam judger 48, selects the beam of which reception quality is good (process 1030), further, selects the RACH access slot number corresponding to the selected beam in the access slot selector 49 with reference to the slot data for the individual beams in Table 1 or 2 in the memory 491 (process 1040), and selects one RACH access slot number out of the group (process 1050).

The number of the selected RACH access slot is notified to the RACH transmitter 51, and the RACH transmitter 51 transmits the RACH preamble to the BS 10 through the RF transmitter 52 and the transmitting antenna 53 in the RACH access slot (process 1060).

On the other hand, in the BS 10, as depicted in FIG. 15, when the RACH preamble transmitted by the UE 40 as described above is received by the receiving antenna 21 and the RF receiver 22 (process 2010), the received signal is copied by the coping unit 24 and the weighting coefficients specified by the beam specifying unit 29 are multiplied by the same received signal in the beam formers 25A and 25B and the reception beam forming is performed. That is to say, the received signals by the received beams formed by the weighting coefficients used for the beams A and B, which transmit the SCH, are obtained by the beam formers 25A and 25B, respectively (process 2020).

Then, the received signals corresponding to the beams A and B are subjected to the detection process of the RACH access slot for each of the beams A and B according to the designation by the upper layer processor 28, in the RACH reception processors 26A and 26B, respectively (process 2030).

As a result of each reception processing, if the reception of the RACH preamble is detected in any of the RACH reception processors 26A and 26B (if YES in process 2040), the BS 10 generates the RACH response for the UE 40, which is the source of the detected RACH preamble, by the RACH response generator 27 (process 2050), and transmits the same to the UE 40 through the data transmitter 14, the second multiplexer 15, the RF transmitter 16, and the transmitting antenna 17 (process 2060). Meanwhile, when the RACH preamble is not detected, the RACH response is neither generated nor transmitted (NO root in process 2040).

As described above, according to this embodiment, the UE 40 judges and selects the beam of which propagation channel loss is small based on the reception quality of the SCH transmitted by the BS 10 using a plurality of different beams and performs the RACH preamble transmissions by the RACH access slot number corresponding to the selected beam, so that this may notify the BS 10 of the beam preferred or optimal for the RACH preamble reception. Thus, the BS 10 may perform multi-beams elective reception such that the RACH preamble reception quality is preferable or optimal, thereby improving the reception quality of the RACH preamble in the BS 10.

[3] Second Embodiment

Figure 16:
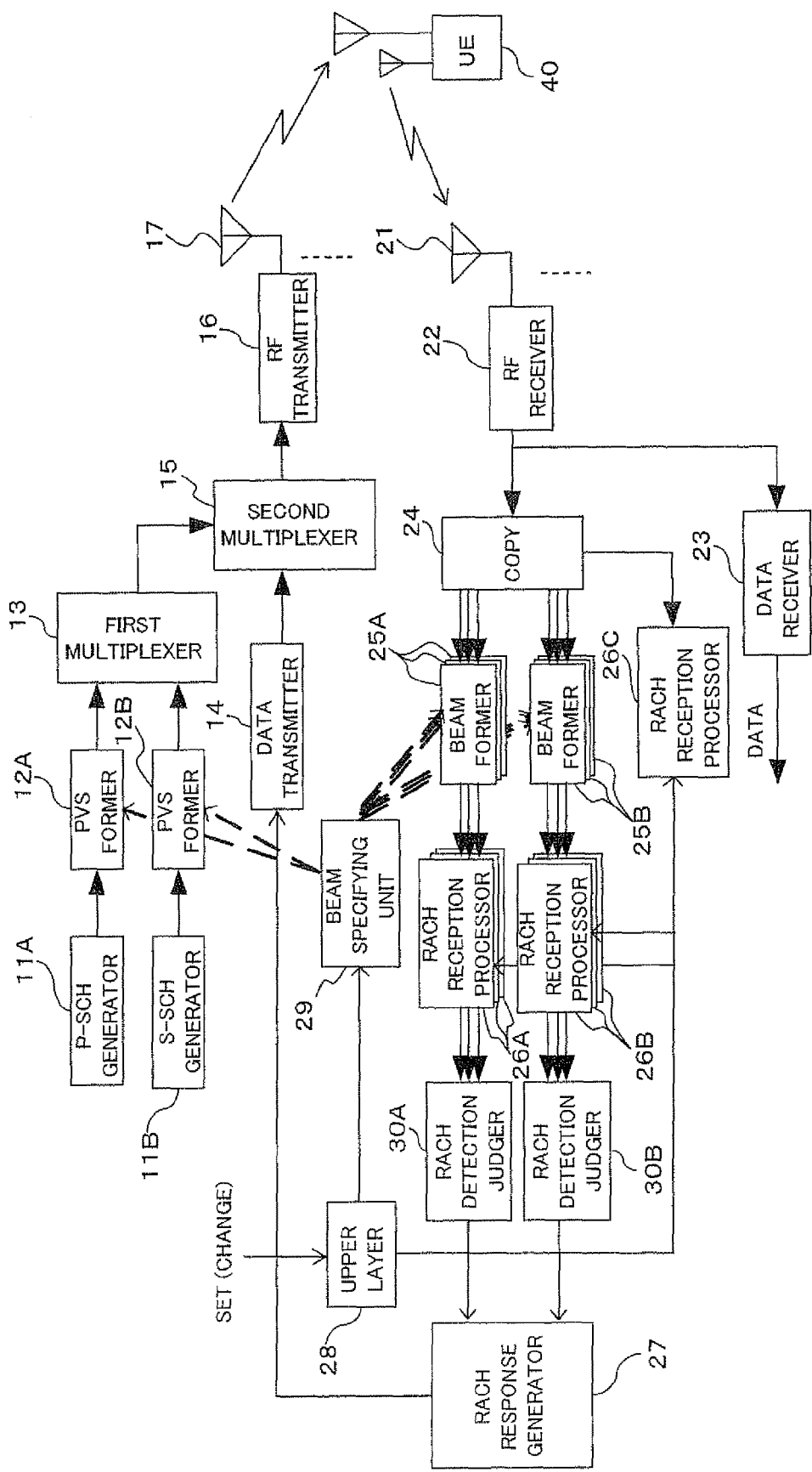
FIG. 16 is a block diagram illustrating a detailed configuration example of the BS according to a second embodiment.

FIG. 16 is a block diagram showing a configuration example of the BS 10 according to a second embodiment. The configuration of the UE 40 can be the same as that depicted in FIG. 13. The configuration of the BS 10 depicted in FIG. 16 corresponds to the detailed configuration example realizing the process described with reference to FIGS. 9 and 10. Meanwhile, in FIG. 16, the component given the reference numeral the same as the numeral in FIG. 12 is the component the same as or similar to the already described component unless otherwise noted.

That is to say, the BS 10 of this embodiment forms, in addition to the beam used for transmitting the SCH, another beam having a directivity similar to that of this beam and performs the reception processing of the specified RACH access slot using the beams, and performs the existing RACH preamble reception processing for the received signal other than the beam used for transmitting the SCH.

For example, supposing that the BS 10 forms three received beams A, A1 and A2 including the beam the same as the beam A with respect to the transmitted beam A of the SCH, and forms three received beams B, B1 and B2 including the beam the same as the beam B with respect to the transmitted beam B of the SCH, this is provided with three beam formers 25A and three RACH reception processors 26A so as to correspond to three beams A, A1 and A2 and three beam formers 25B and three RACH reception processors 26B so as to correspond to the beams B, B1 and B2.

In this case, three beam formers 25A separate the received signals of the beams A, A1 and A2 by multiplying the different weighting coefficients for A-series beams specified by the beam specifying unit 29 by the received signal from the copying unit 24.

Similarly, three beam formers 25B separate the received signals of the beams B, B1 and B2 by multiplying the weighting different coefficients for B-series beams specified by the beam specifying unit 29 by the received signal from the copying unit 24.

Then, each of the three RACH reception processors 26A perform the detection process of the RACH access slot number grouped as that for the beam A with respect to the received signal of the separated A-series beams.

Similarly, each of the three RACH reception processors 26B perform the detection process of the RACH access slot number grouped as that for the beam B with respect to the received signal of the separated B-series beams.

In addition, the BS 10 of this embodiment is provided with a RACH detection judger 30A for detecting that the RACH preamble is received in any of the RACH reception processors 26A for the A-series beams, and a RACH detection judger 30B for detecting that the RACH preamble is received in any of the RACH reception processors 26B for the B-series beams. Meanwhile, the RACH detection judgers 30A and 30B may be a single RACH detection judger 30 commonly used for each beam of A-series and B-series, as depicted in FIG. 10.

Thereby, when the reception of the RACH PREAMBLE is detected in any of the RACH reception processors 26A and 26B, the RACH response for the UE 40 being the RACH source is generated in the RACH response generator 27, and is transmitted to the UE 40 through the data transmitter 14, the second multiplexer 15, the RF transmitter 16, and the transmitting antenna 17.

Figure 17:
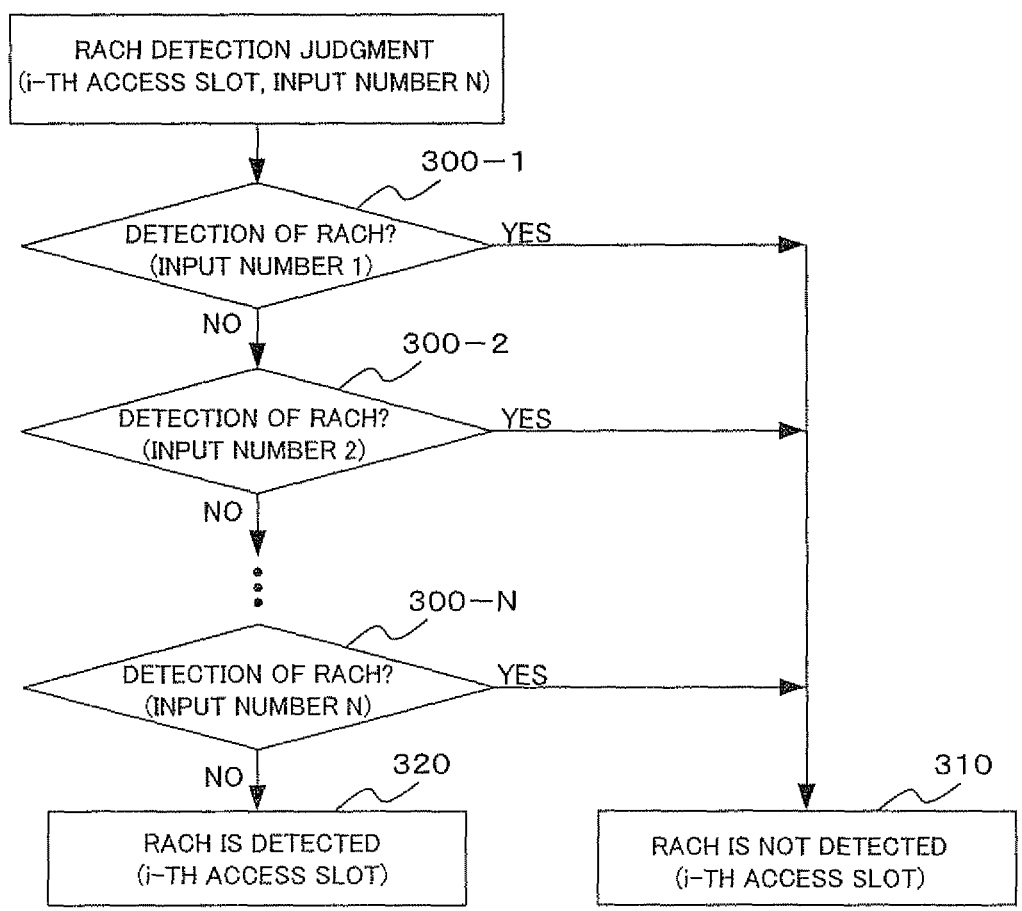
FIG. 17 is a flowchart for illustrating RACH preamble detection judging process in the BS depicted in FIG. 16.

Meanwhile, the RACH detection judgment may be represented as a flowchart depicted in FIG. 17, for example, by generalizing the number of beams=N and the RACH access slot number=i, wherein N is an integer not smaller than 2 and $1 \le i \le$ RACH access slot number for the individual beams.

That is to say, in the processes 300-1 to 300-N, as a result of the detection process of the RACH access slot for the received signal of beams #j wherein j=any of 1 to N, when the reception of the RACH preamble is detected in any of the RACH access slot numbers=i of any of the beams #j, RACH preamble is detected (process 310), otherwise the RACH PREAMBLE is not detected (process 320).

[4] Upper Layer Process

Figure 18:
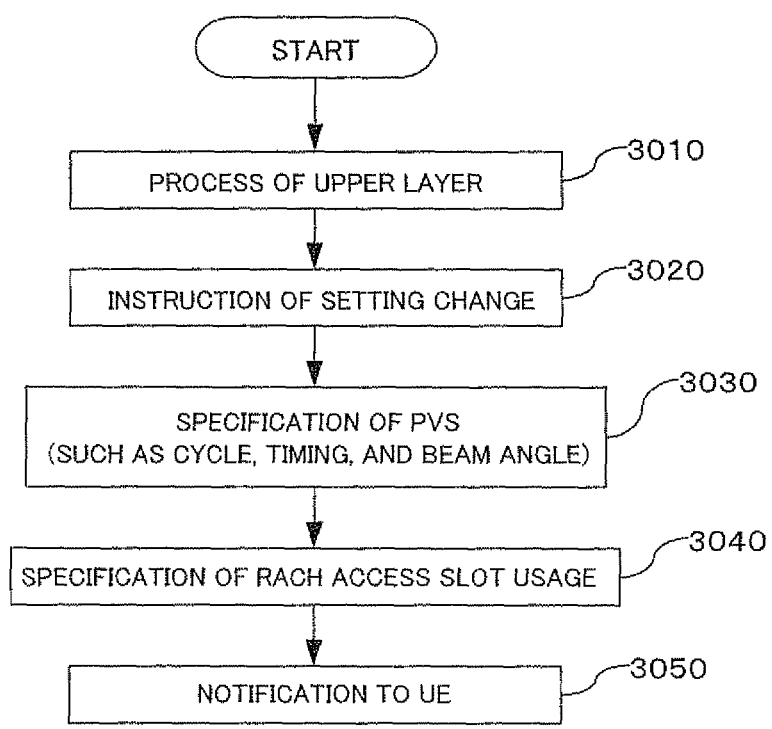
FIG. 18 is a flowchart for illustrating an upper layer process in the BS depicted in FIGS. 12 and 16.

The slot data for the individual beams as depicted in Tables 1 to 4 is shared by both of the BS 10 and the UE 40 as described above, and the setting thereof may be performed by signaling in the upper layer, for example. FIG. 18 shows one example thereof.

When the upper layer processor 28 of the BS 10 receives a setting instruction of a system parameter including the RACH access slot number and the slot number or the like from an operator terminal or the like in the upper layer process (processes 3010 and 3020), the upper layer processor 28 gives the beam specifying unit 29 information for the beam specifying unit 29 to specify with respect to the PVS formers 12A and 12B as described above (process 3030).

Also, the upper layer processor 28 sets the slot data for the individual beams as depicted in any of Tables 1 to 4 according to the setting instruction to the beam specifying unit 29, thereby allowing the beam specifying unit 29 to specify the weighting coefficient for forming the received beam and the multiplying timing thereof with respect to the beam formers 25A and 25B (process 3040).

Then, the upper layer processor 28 notifies the UE 40 of information regarding the PVS and the slot data for the individual beam by the BCH, for example (process 3050). That is to say, the upper layer processor 28 in this example serves as a notifying unit for notifying the UE 40 of correspondence between the multi-beams and the RACH access slots.

The notified information is received by an upper layer processor 50 of the UE 40, and the upper layer processor 50 performs setting of the information necessary for the beam judger 48 and the access slot selector 49 based on the notified information.

By the upper layer process as described above, the BS 10 and the UE 40 are allowed to perform the operations described in the first and second embodiments, respectively. Meanwhile, it may be configured that application of the operation is recognized by the setting instruction for the BS 10 and by the notification for the UE 40, or that this may be recognized by the BS 10 and the UE 40 by dedicated messages.

[5] Notification of Dedicated RACH Access Slot at the Time of HO

Next, a specific example of the process of notifying the UE 40 of a plurality of dedicated RACH access slot numbers depicted in FIG. 4 and Table 4 is described with reference to FIGS. 19 and 20 by taking the time of HO of the UE 40 as an example, as a usage 4 of the RACH access slot group.

Figure 19:
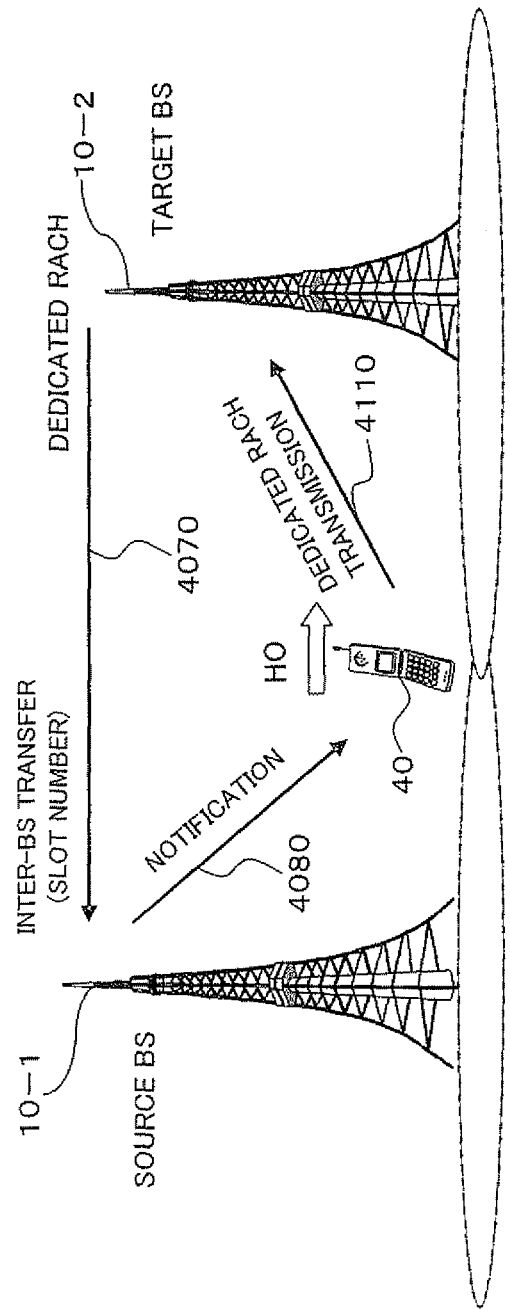
FIG. 19 is a schematic diagram for illustrating an allocation process of a dedicated RACH access slot by the BS according to HO of the UE of the first and second embodiments.
Figure 20:
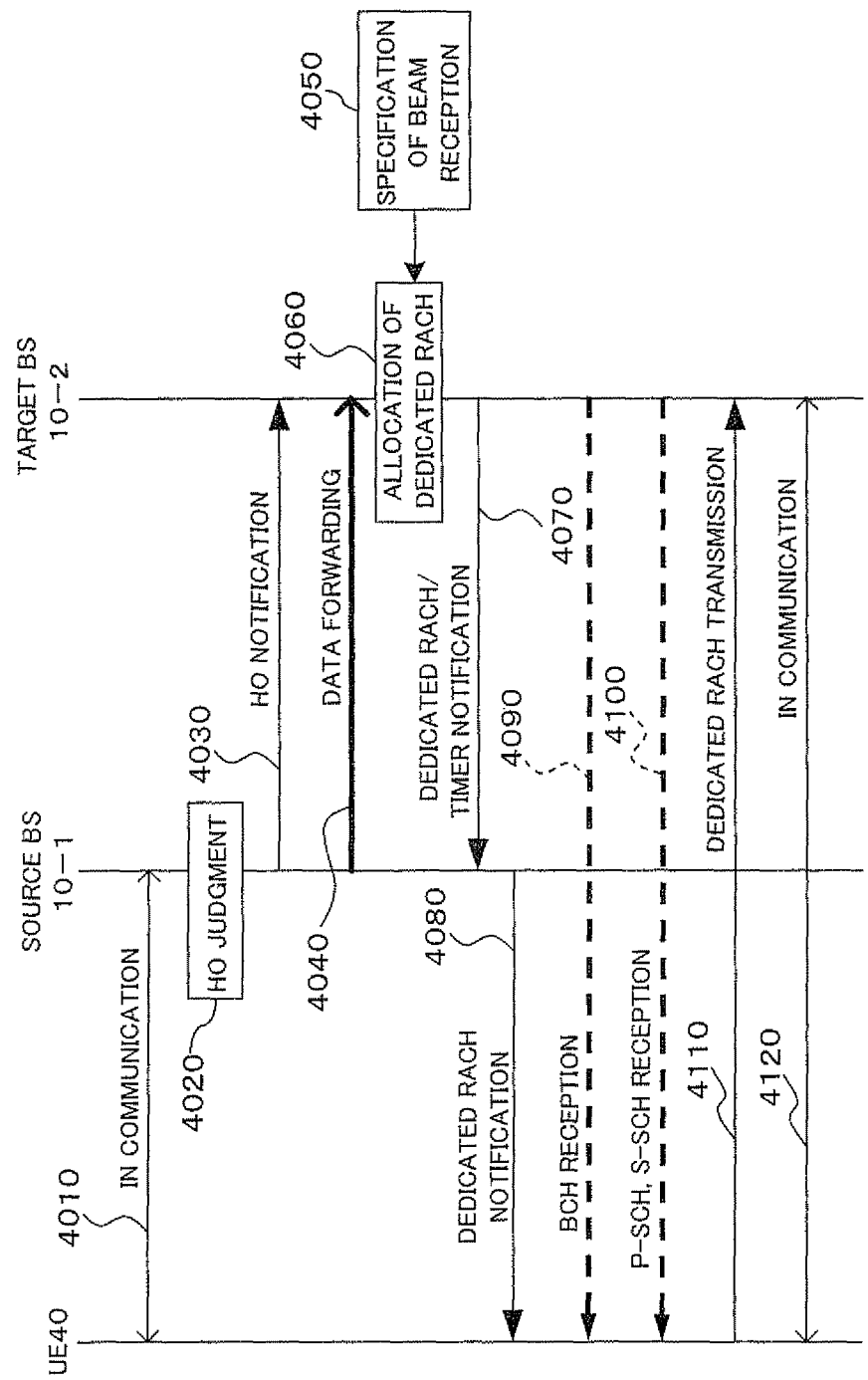
FIG. 20 is a sequence diagram for illustrating in detail the allocation process depicted in FIG. 19.

FIGS. 19 and 20 each illustrates the process when the UE 40 shifts from a source BS 10-1 to a target BS 10-2 and the UE 40 switches a connection target from the source BS 10-1 to the target BS 10-2.

Meanwhile, the process number (process 4070) in FIG. 19 corresponds to the process number in FIG. 20. Also, the source BS 10-1 and the target BS 10-2 have the configurations the same as or similar to the BS 10 described in the first and second embodiments, respectively, and it is possible to cyclically switch the transmitted beam of the SCH by the PVS. In this case, the number of beams used for the transmission of the SCH by the PVS may be the same as or different from that of the BS 10-1 and the BS 10-2.

The source BS 10-1 monitors whether a HO process due to the shift of the UE 40 is necessary or not (process 4020), when the communication with the UE continues (process 4010). For example, the source BS 10-1 holds the information of an adjacent BS and an adjacent cell, and judges whether it is better that the UE 40 switches the connection targeted to the target BS 10-2 or not based on this information and information such as the UL received power from the UE 40. Meanwhile, it is preferable that the judgment is performed in units of UE 40.

As a result, if it is judged that it is preferable to perform the HO process, the source BS 10-1 transmits HO request to the target BS 10-2 (process 4030), and forwards the DL data for the UE 40 as necessary (process 4040). Meanwhile, it is possible to set a direct communication channel between the source BS 10-1 and the target BS 10-2 through an inter-BS interface, and the HO notification and the forwarding are made through the communication channel, for example.

Then, the target BS 10-2, which has received the HO request, selects the RACH access slot numbers for the individual beams, which may be used for specifying the beam of the RACH preamble reception with respect to the target BS 10-2, based on the slot data for each beam as depicted in FIG.

4 and Table 4 in the upper layer processor 28, and notifies the source BS 10-1 of the same by the inter-BS interface (processes 4050, 4060, 4070).

That is to say, the upper layer processor 28 in this example serves as the notifying unit for notifying the source BS 10-1 being another BS of the correspondence between the multi-beams and the RACH access slots.

The source BS 10-1 notifies the UE 40 of a group of the RACH access slot numbers received through the inter-BS interface by the radio link already established with the UE 40 (process 4080).

The UE 40, which has received this notification, sets the RACH access slot numbers, which may be used to specify the beam requesting the target BS 10-2 of the RACH preamble reception with respect to the beam judger 48 and the access slot selector 49 by the upper layer processor 50.

After that, the UE 40 receives the BCH from the target BS 10-2 (process 4090), and further receives the SCH (process 4100), then judges the beam of which reception quality is optimal out of a plurality of beams by the PVS by the beam judger 48 as in the flowchart depicted in FIG. 14.

Then, the UE 40 selects the dedicated RACH access slot corresponding to the selected beam by the access slot selector 49 out of the RACH access slots notified by the target BS 10-2 through the source BS 10-1, and performs transmission of the UL dedicated RACH preamble, that is to say, initial connection request to the target BS 10-2 by the RACH transmitter 51 in the dedicated RACH access slot (process 4110).

When the dedicated RACH preamble is correctly received by the target BS 10-2, the RACH response for the UE 40 being the source of the dedicated RACH preamble is generated by the RACH response generator 27 and is transmitted to the UE 40, and after that, the connection between the UE 40 and the target BS 10-2 is established, thereby the communication becomes possible (process 4120).

As described above, according to this embodiment, in the HO process by the UE 40, the RACH access slot numbers for the individual beams, which may be used by the UE 40 to specify the beam of the RACH preamble reception with respect to the target BS 10-2, is notified to the UE 40 through the source BS 10-1, so that the reception quality of the RACH preamble in the target BS 10-2 may also be improved.

[6] Others

Meanwhile, although a case in which one example of the radio resources, which are associated with the multibeam, is the RACH access slot has been described in the embodiment described above, in a case of another radio channel in which the propagation channel estimating is impossible or difficult by using the known signal such as the RS and the pilot as in the RACH preamble, it is possible to improve the reception quality on a receiving side of the radio channel, by associating the radio resources of the radio channel with the multi-beams as in the above-described example.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication method for a radio communication system, the system having a user equipment and a radio base station, which transceives information with the user equipment using multi-beams, the communication method comprising:
    transmitting information for the radio base station from the user equipment to the radio base station selectively using either of radio resources associated with a beam which is one of the multi-beams formed by the radio base station and is selected by the user equipment, and
    receiving the information, which is transmitted by the radio resource, using the beam associated with the radio resource, wherein the radio resource is radio resource of a frequency divided or time domain divided uplink random access channel, or radio resource of an access slot obtained by dividing the radio resource of the random access channel by encoding.

2. The communication method according to claim 1, wherein the radio resource with which the user equipment transmits the information is selected based on reception quality of the individual beams of the information received from the radio base station using the multi-beams.

3. The communication method according to claim 2, wherein the selected radio resource is radio resource corresponding to the beam of which reception quality is optimal.

4. The communication method according to claim 2, wherein the receiving includes reception beam forming using a weighting coefficient the same as that used for forming the multi-beams.

5. The communication method according to claim 1, wherein a plurality of adjacent ones of the multi-beams are associated with the same radio resources.

6. The communication method according to claim 1, the method further comprising:
    when reception of the information transmitted by the user equipment using the radio resources is detected in the receiving, transmitting response information to the user equipment from the radio base station.

7. The communication method according to claim 1, the method further comprising:
    notifying from a first one of the radio base station to the user equipment or a second one of the radio base station correspondence between the multi-beams and the radio resources.

8. The communication method according to claim 7, wherein the first radio base station is a base station being a handover target of the user equipment, and the second radio base station is a base station being a handover source of the user equipment.

9. The communication method according to claim 8, the method further comprising:
    notifying from the base station being the handover source to the user equipment the correspondence notified from the base station being the handover target.

10. A user equipment for a radio communication system, the system having the user equipment and a radio base station, which transceives information with the user equipment using multi-beams, the user equipment comprising:
    a selector that selects either of radio resources associated with a beam which is one of the multi-beams formed by the radio base station and is selected by the user equipment; and
    a transmitter that transmits information to the radio base station using the selected radio resource, wherein the radio resource is radio resource of a frequency divided or time domain divided uplink random access channel, or radio resource of an access slot obtained by dividing the radio resource of the random access channel by encoding.

11. The user equipment according to claim 10, wherein the selector selects the radio resource with which the information for establishing a radio link with the radio base station is transmitted, based on reception quality of the individual beams of the information received from the radio base station using the multi-beams.

12. The user equipment according to claim 11, wherein the selector selects the radio resource corresponding to the beam of which reception quality is optimal.

13. The user equipment according to claim 10, wherein the selector has a memory, which holds correspondence between the multi-beams and the radio resources, which is used for the selection.

14. The user equipment according to claim 13, further comprising a setting unit that receives the correspondence from the radio base station and sets the correspondence to the memory.

15. A radio base station for a radio communication system, the system having a user equipment and the radio base station, which transceives information with the user equipment using multi-beams, the radio base station comprising:
  a transmitter that transmits the information to the user equipment using the multi-beams; and
  a receiver that detects information transmitted from the user equipment using either of radio resources associated with a beam which is one of the multi-beams formed by the radio base station and is selected by the user equipment, by receiving the information, which is transmitted by the radio resource, using the beam associated with the radio resource, wherein the radio resource is radio resource of a frequency divided or time domain divided uplink random access channel, or radio resource of an access slot obtained by dividing the radio resource of the random access channel by encoding.

16. The radio base station according to claim 15, wherein the receiver has a reception beam former that performs reception multi beam forming using a weighting coefficient the same as that used for forming the multi-beams in the transmitter.

17. The radio base station according to claim 15,
  wherein the receiver has:
  a detector to detect reception of the information transmitted by the user equipment using the radio resources in the receiving, and
  a response information generator to generate response information for the user equipment to transmit the information to the user equipment upon detection of the reception in the detector.

18. The radio base station according to claim 15,
  wherein the transmitter has a notifying unit to notify the user equipment or another radio base station of correspondence between the multi-beams and the radio resources.

19. The radio base station according to claim 18, wherein the correspondence to be notified to the user equipment is notified from a base station being a hand over target of the user equipment.

* * * * *